June 13, 1972  A. VACCARO  3,669,543
METHOD AND APPARATUS FOR STANDARDIZING DENSITOMETERS
Filed Feb. 6, 1970
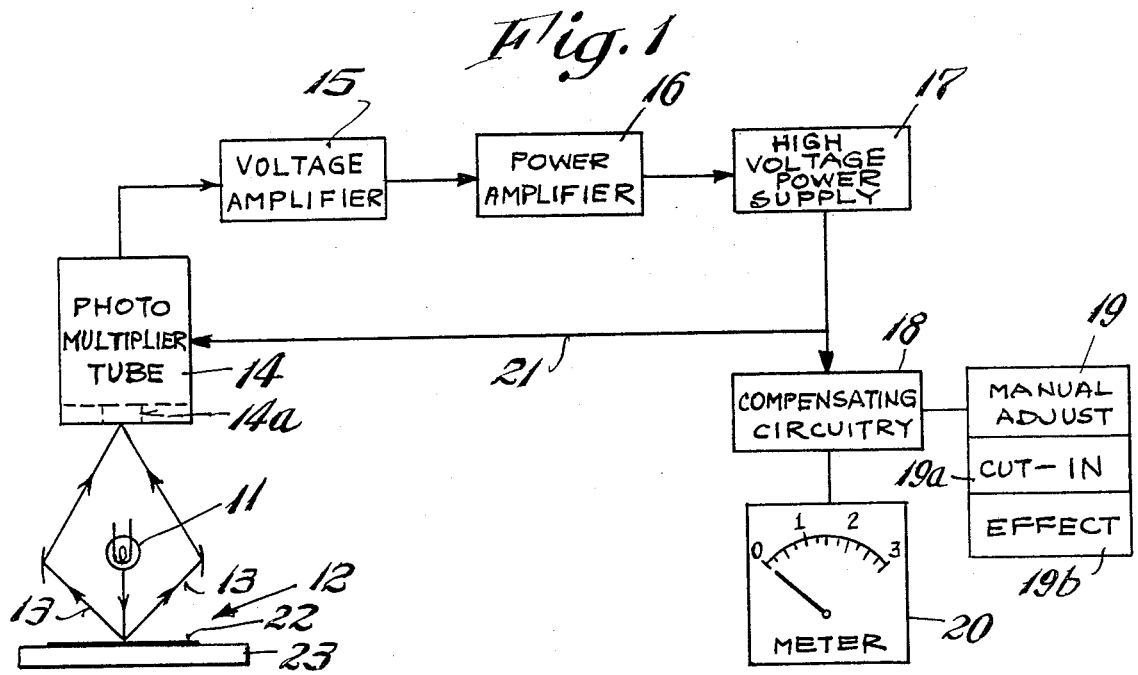
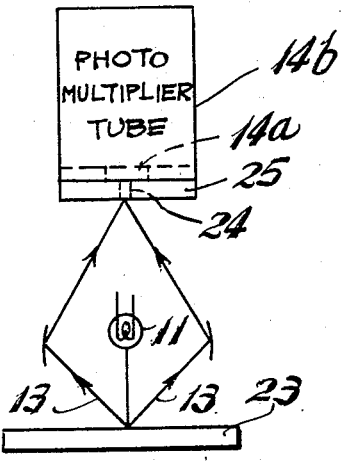
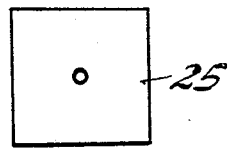
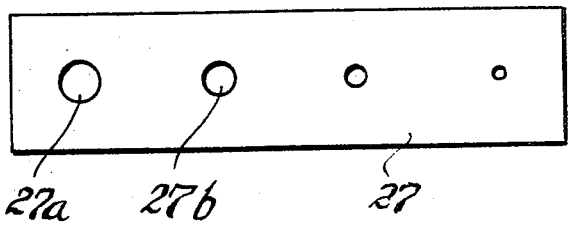
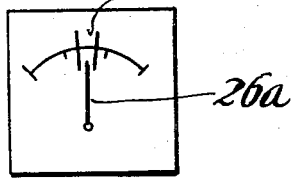
INVENTOR.
Angelo Vaccaro
BY
Johnson and Kline
ATTORNEYS

United States Patent Office 3,669,543
Patented June 13, 1972

3,669,543
**METHOD AND APPARATUS FOR STAND-
ARDIZING DENSITOMETERS**
Angelo Vaccaro, Port Washington, N.Y., assignor to
 Columbia Controls Research Corporation, Glen Cove,
 N.Y.
Filed Feb. 6, 1970, Ser. No. 9,284
Int. Cl. G01n *21/20, 21/48, 33/16*
U.S. Cl. 356—42                                         7 Claims

ABSTRACT OF THE DISCLOSURE

A method and apparatus for standardizing two densitometers to have the same reading for samples having the same optical density even though both densitometers are not identically calibrated by reading the sample with one densitometer and noting its density. An opaque screen having an aperture is then positioned before the light entrance of the densitometer with the size of the aperture being adjusted to produce the same densitometer reading as the sample. An opaque screen having the same size opening is then placed before the light entrance of the second densitometer and this second densitometer is adjusted to have the same reflectivity reading as the first densitometer. A sample accordingly having the same optical density will be read identically by both meters. Also, the openings, accurately sized for desired density readings may be used for calibrating a densitometer.

---

The present invention relates to the art of measuring light energy which is either transmitted through or reflected by a sample. One important area, especially for reflected light, in which the art has importance, is in the graphic and/or printing field where it is desired to be able to measure the density of printed characters to determine if their quality meets acceptable standards. There are commercially available instruments for performing such measurements, generally called densitometers with one such instrument being available from the MacBeth Instrument Corporation, Newburgh, N.Y.

The ability of a sample to reflect light, called its reflection density, has been standardized to a scale wherein 100% reflection (perfect white) is denoted 0, 10% reflection is denoted 1, 1% reflection 2, .1% reflection 3, etc., with 3 being to the human eye very black. The densitometers use a photo-responsive cell such as a photomultiplier tube to sense light reflected from the sample to the tube and the tube's output is amplified and modified to provide a voltage to a volt meter which has a scale reading in density units (usually 0–3). Thus, by illuminating a sample and having light reflected from the sample to the tube, the optical density of the sample may be easily read.

In commercial use, the optical density which a sample is required to have is selected with a common tolerance range being + or —0.02 density units therefrom and commercially available densitometers are sufficiently precise to measure well within this tolerance. However, the validity of the reading depends on the densitometer being accurately calibrated. By its very nature a densitometer is subject to many factors which can cause it to lose its calibration and if the inaccuracy is only five or ten hundreths of a density unit, an operator does not become aware that it is inaccurate. Moreover, as it may require at least one-half a day for a skilled technician to calibrate it, common practice for commercially used instruments is not to maintain them accurately calibrated.

Thus, when the same sample is read by two different not precisely calibrated instruments, they have different readings and the difference is usually greater than the normal tolerance. Accordingly, one instrument may read that a sample has an accepted value while the other instrument may indicate that the same sample does not, thereby causing conflict, especially if one instrument is owned by a supplier of graphic supplies while the other is owned by a purchaser of the supplies.

It is accordingly an object of the present invention to provide a simple, reliable and effective method for standardizing two densitometers to have the same reading for an identical sample.

Another object of the present invention is to provide for calibrating a densitometer without resort to conventional standardized tile samples having carefully controlled optical densities.

A further object of the present invention is to achieve the above objects with little or no change in presently available densitometers and yet which is adaptable to many makes of commercially available densitometers.

Still another object of the present invention is to provide an apparatus which may be easily made, which may be easily reproduced and which is physically unalterable during use as opposed to an actual sample which deteriorates with time.

In carrying out the present invention there is provided a commercially available densitometer which includes a photo-responsive cell, a light source, a meter and various electrical control circuits. A sample having the desired reflective density is placed so that the light source directs light onto the sample and light reflected therefrom passes through a light entrance to impinge on the photo-responsive cell. The meter indicates the reflection density of the sample which should be within the general range of the sample even though the meter is not precisely calibrated. Without making any change in the instrument, an opaque screen is then positioned at the light entrance to the photo-cell and an aperture is formed in the screen. The size of the aperture is altered until the meter reads the same as it did for the sample.

If another densitometer is desired to be standardized to have the identical reading for the same sample, then the opaque screen is positioned on the second densitometer and it is adjusted by its various electrical controls to cause its meter to have the same reading as the original sample. Thus both the instruments will be standardized to the same quantity to provide the same reading for an identical sample.

It has also been found that the present invention may also be employed to calibrate a densitometer according to standard reflection densities of various samples over the range of the meter. Normally a densitometer is calibrated by individually sensing the reflectivity of a number of different tiles with each having a different known reflection density. The densitometer is adjusted by its electrical controls so that its meter will read the reflection density indicated on each tile. As there are perhaps up to 10 tiles having different shades of black then the technician is required to adjust the densitometer for each of the standard shades to calibrate it.

In accordance with the present invention, apertures are formed in an opaque screen with each aperture corresponding to different meter readings so that there could be an opaque screen having up to ten different size apertures each of which is required to produce a known reading on the densitometer. Thus, a screen with ten apertures is used as a standard rather than ceramic tiles. The screen may be economically formed of metal which renders it extremely durable, and permanently accurate as opposed to possible scratching, etc., of a tile which could alter its reflection density.

Other features and advantages will hereinafter appear.

In the drawing.

FIG. 1 is a pictorial and block diagram of a conventionally available densitometer, labeled prior art.

FIG. 2 is a detail similar to FIG. 1 in which the present invention is used with the densitometer.

FIG. 3 is a plan of an opaque screen having an aperture therein.

FIG. 4 is a view of a meter which may be used with the present invention.

FIG. 5 is a view of an opaque screen having a series of different size apertures for enabling calibration of a densitometer for different reflective densities.

Referring to the drawing, a commercially available densitometer is shown in FIG. 1 and indicated as prior art. Such an instrument includes a light source 11 which is mounted to direct light onto a sample 12 with the sample reflecting light as indicated by the rays 13 to a photomultiplier tube 14. The output of the tube 14 is amplified by a voltage amplifier 15 and a power amplifier 16 and applied to a high voltage power supply 17. The output of the latter circuit is applied to a compensating circuitry 18 having manual adjustments 19 with the output of the circuitry 18 being a voltage whose value is indicated on a volt meter 20.

The meter 20, as shown, has a linear scale ranging from 0 to 3 in density units. However, the photomultiplier tube is essentially logarithmic responsive to the quantity of light it receives and there may be a feedback circuit indicated by the line 21 to adjust the photomultiplier tube to different voltages at different light intensities in order to basically convert the logarithmic response to a linear scale reading.

The sample 12, as shown, has a dark mark 22 printed or otherwise formed on a piece of standard stock 23, such as paper having specified qualities and with the reflective density of the mark 22 being desired to be measured. The operator places the measuring head of the densitometer having the light and tube therein on the mark and reads the density reading on the meter 20. Light from the source 11 shines onto the mark and is reflected through a light entrance 14a to impinge on the tube whose response, after compensation, is indicated by the meter reading.

An operator may measure perhaps 300 to 400 different samples in a day if the instrument is used for quality control in a manufacturing plant where, for example, it may measure the quality of printing of a printing press, half-tones, photo-finishing, dye concentration, pressure formed images, etc. While an operator may easily read the indicator of the meter, for a sample, there is no way of knowing in the absence of an extremely wrong reading that the densitometer has changed its calibration and hence is not reading correctly. A sample may be acceptable only if within a tolerance ±.02 density units of a selected reading while an operator cannot visually determine if it is ±.2 units from the selected optical density. Thus, a change in the instrument's calibration that is sufficient to cause a sample to be outside its acceptable range and hence not acceptable, is not visually perceivable by an operator.

Many factors contribute to the possibility of the calibration of the instrument being changed. These include a change in the quantity of light from the light source 11, aging of the photomultiplier tube, changes in the parameters of electrical circuits connected to the photomultiplier tube including changes in component values, etc. Thus, unless a densitometer is tested against a standard at least every few weeks and any error corrected, there is a tendency for the instrument to become inaccurate.

If the meter is tested against standard shaded tiles and the reading is more than + or −.02 density units from the standard of the tile, then the meter is considered to be out of calibration and requires servicing by a skilled technician. However, to calibrate the instrument the technician may require up to a half a day in order to set the instrument over the entire range. Thus, it usually occurs that, densitometers in industrial use are generally not precisely calibrated and will have an error greater than the normal acceptable tolerance. When two not precisely calibrated densitometers are used to measure the same sample as when one densitometer is that of a graphic art supplier and indicates that a sample has an optical density within a required standard while the other densitometer is used by a graphic arts purchaser and indicates that the sample is outside the accepted standard, difficulties are created as by rejection of the supplier's products by the purchaser.

I have found that even though both densitometers may be sufficiently out of calibration to cause unacceptable readings that they will be sufficiently accurate over a small range about the desired reading of the sample if they are not so far out of calibration as to cause a visually preceivable error. Thus, if both densitometers are adjusted at the same reading which may be the optical density of the sample, they will read the sample within the + or −.02 density unit tolerance with only a small 1 or 2% error in the tolerance range requirement. Accordingly, the present invention provides for in one aspect setting both densitometers to a standard so that they will both read the same optical density for the same sample within a negligible range of error.

In one form of the invention, a visually acceptable sample, such as the sample 12, is first measured on a first densitometer with a piece of standard stock 23 being positioned to reflect the rays from the light source 11 and the reading of the sample is noted with the reading being approximately the optical density of the sample. The sample is then removed from the densitometer and an opaque screen 25 is placed in front of the light entrance such as the entrance 14a to the photomultiplier tube 14. No changes are made in the densitometer and a small aperture such as the aperture 24 in the screen 25 is formed in alignment with the light entrance 14a. The reading of the meter is noted and the size of the aperture is continually increased until the meter reads the same as the sample, it being understood that all light which impinges on the tube 14 passes through the aperture in the screen 25. The opaque screen 25 accordingly has an aperture which is of a size to cause the same meter reading as the sample and an unchanging standard which when applied to a densitometer should cause the same reading on the meter 20.

The screen 25 is then applied to a second densitometer and the second densitometer is adjusted as by the manual adjustments 19 to cause its meter to read the same as the first densitometer.

After this adjustment, both densitometers are now set at the same calibration with any error between them within a tolerance range of ±.02 units being negligible. Accordingly, a quality control sample applied to one densitometer and producing the desired reading will, when applied to the second densitometer, also provide the same reading.

While it may be possible to utilize the same sample to adjust both densitometers, samples in the printing art are not durable and deteriorate with age so that after a period of time, their optical density would change and hence would not be acceptable as a sample. The use of the opaque screen 25 with the aperture 24 sized to produce a selected meter reading is a durable structure as it is formed of metal and is essentially unchanging with age and hence obviates the disadvantages inherent in the use of an optical density sample. Moreover, if samples such as colored tiles are employed they tend to become scratched or otherwise caused to lose their exactness which again could introduce error into the densitometer measurements.

While the above-described method is for measuring optical reflectivity and hence uses stock 23 as a reflector, if opaqueness is to be measured, the sample would not be employed.

One kind of densitometer which may be employed in the present invention is a MacBeth Quantalog Densitometer Model RD–100. This densitometer has in its compensating circuitry 18 at least one shunt circuit which shunts a portion of the feedback voltage which appears across the meter to the photomultiplier tube on the line 21. Each shunt circuit includes a first potentiometer known as a cut-in potentiometer 19a and this determines at which voltage the circuit will conduct and effect compensating of the photomultiplier tube. Another potentiometer in each shunt circuit is known as an effect potentiometer 19b and determines the amount of compensation which is added by the circuit at the voltage level determined by the cut-in potentiometer. In practicing the above-noted method the cut-in potentiometers would not be adjusted if the meter reads close to the sample's optical reflectivity but would be adjusted if an operator notices a substantial difference between the sample's density and the meter reading. The effect potentiometer 19b however, is utilized to adjust the meter reading of the second potentiometer to that which is required by the standard screen 25. Thus by merely turning a potentiometer knob the second densitometer may be brought to the same reading as the first potentiometer.

If desired, and especially when many readings are to be made, a meter may be employed such as shown in FIG. 4 wherein there is set forth a small band of the meter denoted 26 which may be considered a "go" portion with the remainder of the meter being made "no go" portion. Thus either or both densitometers are initially adjusted through their compensating circuits to cause the meter needle 26a to be in the "go" portion when the screen 25 is used.

The above procedure is utilized when the sample is indicated as being visually acceptable without stating the optical density thereof in units. If, however, it is desired to calibrate a densitometer to a specific optical density, the aperture 24 in the screen 25 is made to have a size which causes the specific density on a calibrated densitometer. The screen is then used in another densitometer as a standard and the latter is adjusted through the use of the effect and/or cut-off potentiometers until the specific density is indicated. Thus the second densitometer will then be calibrated for optical densities about the selected density.

The present invention is also capable of being used to calibrate a meter over its entire range. The present method of calibrating an instrument involves the use of ceramic plaques which may have up to ten portions with each portion having a different specified optical density such that the first portion may be perfectly white and the last portion substantially black. For each of these portions the meter is adjusted through the cut-in and effect potentiometers until the densitometer meter reads the indicated optical density of the portion. By setting the densitometer for each of the portions the densitometer may then be calibrated throughout its full range. The use of the ceramic plaques, however, is not only expensive as each plaque is in effect an optical standard and must be precisely manufactured but they tend to have their reflection density altered either through aging or careless handling by an operator.

In accordance with the present invention the use of plaques is overcome with their disadvantages through the use of a screen such as a screen 27 shown in FIG. 5. This screen includes a plurality of apertures 27a, 27b, etc., which decrease in size with the larger being indicative of a white reflective density and the smaller being equivalent to a substantially black reflective density. The size of the apertures are made to produce a selected meter reading as with each portion of the ceramic plaque, and as each aperture is placed at the light entrance of the photomultiplier, the densitometer is adjusted to the reading for each aperture. It will be appreciated that the screen 27 is not only unalterable with age and more economically manufactured than a ceramic plaque but also it is capable of withstanding more maltreatment than a ceramic plaque without changing.

The particular construction of the screens 25 and 27 will depend upon the shape of the densitometer to which they are applied and guides or clamps may be provided on both to facilitate their attachment to the densitometers. It will be understood that a densitometer while an accurate instrument it is extremely subject to losing its calibration. One factor which may contribute is the light source 11 deviating from its initial lumen output and also of the various components in the densitometer changing their characteristics. Moreover, if it becomes necessary to replace a photomultiplier tube it has heretofore been required that the instrument be recalibrated to the characteristics of the new tube. However, by the present invention after replacement of a tube it is unnecessary to recalibrate the instrument if the instrument is merely being used to check quality at one optical density as the only requirement would be the altering of the poteniometers to cause the meter to read the desired reading when the screen 25 is placed in the potentiometer.

It will be understood that the present invention is also utilizable with a densitometer used to measure optical density of colors. However, in order to be used properly both densitometers should use the same color filters so that each will be identical as to the quality of light reflected from the sample to be measured.

It will accordingly be understood that there has been disclosed a method for easily calibrating a pair of densitometers so that they will both read the same value for a sample irrespective of their initial error deviation. This method utilizes a durable, unchanging opaque screen which when positioned to control the quantity of light being sensed by the densitometer requires that the densitometer be adjusted to indicate a selected value of density. When two densitometers are so adjusted, even if they initially had different errors they will indicate the same optical density for the same sample.

Variations and modifications may be made within the scope of the invention and portions of the improvements may be used without others.

I claim:

1. A method for setting a pair of densitometers to substantially the same calibration for one selected optical density wherein each densitometer has a light source for projecting light from the source onto a reflective surface of a sample, light responsive means positioned to receive light reflected from the sample, a light entrance means positioned between the light responsive means and the sample to control the quantity of light impinging on the light responsive means from the sample, an indicating means coupled to the light responsive means and manual adjustment means for adjusting the indicating means to a selectable indicated reading density for a quantity of light passing through the light entrance means comprising the steps of limiting the amount of light reflected from the sample that passes through the light entrance means to the light responsive means by positioning in alignment with the light entrance means of the first densitometer an aperture of fixed size formed in an opaque screen which causes the indicating means of the first densitometer to have the selected optical density reading; limiting the amount of light reflected from an identical sample that passes through the light entrance means to the light responsive means of the second densitometer by positioning in alignment with the light entrance means of the second densitometer an aperture of the same fixed size formed in an opaque screen and adjusting the manual adjusting means of the second densitometer until its indicating means indicates the same optical density reading whereby the two densitometers have the same calibration for the selected one optical density reading.

2. The invention as defined in claim 1 in which the method includes the step of measuring the optical density of a sample by the first densitometer to determine the selected one optical density and the step of fixing the size of the aperture when used with the identical reflecting surface to cause the first densitometer to have the same reading without any adjustment of the first densitometer after reading the sample.

3. The invention as defined in claim 2 in which the approximate optical density of the sample is initially visually perceived and in which there is the step of initially adjusting the first densitometer to approximately the perceived optical density of the sample.

4. The invention as defined in claim 1 in which each indicating means of each densitometer has an acceptable portion in part of its indicating range with the remaining portion of the range being unacceptable, in which there is the step of initially adjusting the first densitometer to indicate the sample's optical density in midportion of the acceptable portion of the indicating means and in which the step of adjusting the second densitometer causes the indicating means to be adjusted to the midpoint of its acceptable portion.

5. The invention as defined in claim 1 in which the first densitometer is accurately calibrated at least at the one selected optical density and in which the step of limiting the amount of light includes fixing the size of the aperture to make it to the size that causes the densitometer to have the one selected reading without altering its calibration whereby the fixed size aperture becomes a standard for subsequently calibrating densitometers when used with the identical reflecting surface.

6. The invention as defined in claim 5 in which the opaque screen is formed to have a plurality of apertures, one for each different optical density desired and in which the step of limiting the amount of light includes fixing the size of each aperture to make it to the size that causes the densitometer to have one different reading for each size aperture whereby the plurality of fixed size apertures becomes a standard for subsequently calibrating densitometers for a plurality of optical densities when used with the identical reflecting surface.

7. A method of calibrating a densitometer to one selected optical density wherein said densitometer has a light source for projecting light from a source onto a reflective surface of a sample with the sample having a known reflecting optical density, light responsive means positioned to receive light reflected from the sample, a light entrance means positioned between the light responsive means and the sample to control the quantity of light impinging on the light responsive means from the sample, an indicating means coupled to the light responsive means and manual adjustment means for adjusting the indicating means to a selectable indicating reading density for a quantity of light passing through the light entrance means comprising the steps of limiting the amount of light reflected from the sample that passes through the light entrance means to the light responsive means by positioning in alignment with the light entrance means an aperture formed in an opaque screen with the aperture having a determined size that should cause the indicating means to indicate the selected optical density and adjusting the manual adjusting means of the densitometer until its indicating means indicates the selected optical density to thereby calibrate the densitometer at the selected optical density.

References Cited
UNITED STATES PATENTS

| | | | |
|---|---|---|---|
| 1,032,260 | 7/1912 | Woodworth | 356—233 |
| 1,915,033 | 6/1933 | Schlichter | 356—233 |
| 2,143,500 | 1/1939 | Smethurst et al. | 356—225 |
| 2,379,103 | 6/1945 | Rath | 356—233 |
| 2,699,086 | 1/1955 | Finch | 356—225 |
| 2,896,508 | 7/1959 | Biedermann | 356—233 X |
| 3,340,764 | 9/1967 | Bergson | 356—177 |
| 3,467,475 | 9/1969 | Celio et al. | 356—179 |
| 3,512,894 | 5/1970 | Wood | 356—195 |
| 3,533,705 | 10/1970 | Fukushima | 356—233 X |
| 2,280,978 | 4/1942 | Roberts | 356—226 |

RONALD L. WIBERT, Primary Examiner

WARREN A. SKLAR, Assistant Examiner

U.S. Cl. X.R.

356—201, 204, 209, 212, 225, 233